US011224797B2

(12) United States Patent
Corpuz

(10) Patent No.: US 11,224,797 B2
(45) Date of Patent: Jan. 18, 2022

(54) WORD FORMING GAME ASSEMBLY

(71) Applicant: Ariel Corpuz, Placentia, CA (US)

(72) Inventor: Ariel Corpuz, Placentia, CA (US)

( * ) Notice: Subject to any disclaimer, the term of this patent is extended or adjusted under 35 U.S.C. 154(b) by 34 days.

(21) Appl. No.: 16/862,202

(22) Filed: Apr. 29, 2020

(65) Prior Publication Data
US 2021/0339117 A1 Nov. 4, 2021

(51) Int. Cl.
A63F 3/04 (2006.01)
A63F 13/822 (2014.01)
A63F 13/77 (2014.01)
A63F 13/46 (2014.01)
A63F 9/04 (2006.01)
A63F 3/00 (2006.01)

(52) U.S. Cl.
CPC .......... A63F 3/0423 (2013.01); A63F 9/0413 (2013.01); A63F 13/46 (2014.09); A63F 13/77 (2014.09); A63F 13/822 (2014.09); A63F 2003/00996 (2013.01); A63F 2003/0426 (2013.01); A63F 2009/0482 (2013.01); A63F 2300/61 (2013.01); A63F 2300/807 (2013.01)

(58) Field of Classification Search
CPC .......... A63F 2001/0458; A63F 3/00643; A63F 3/0421; A63F 3/0423; A63F 2003/0428; A63F 9/0098; A63F 2009/0488
See application file for complete search history.

(56) References Cited

U.S. PATENT DOCUMENTS

| D251,990 S | 5/1979 | Nolan | |
| 4,201,389 A * | 5/1980 | Vowell | A63F 3/0423 273/272 |
| 5,374,065 A | 12/1994 | Motskin | |
| 5,429,371 A | 7/1995 | Bledsoe | |
| 6,199,863 B1 * | 3/2001 | Chan | A63F 3/0423 273/148 R |
| 6,364,766 B1 * | 4/2002 | Anderson | G07F 17/32 273/138.1 |
| 6,428,412 B1 * | 8/2002 | Anderson | G07F 17/32 463/16 |
| 6,557,854 B1 | 5/2003 | Jaspers | |
| 6,650,952 B1 * | 11/2003 | Garcia | A63F 13/69 700/91 |
| 6,685,561 B2 * | 2/2004 | Anderson | G07F 17/32 273/138.1 |
| 7,112,135 B2 * | 9/2006 | Anderson | G07F 17/32 463/16 |
| 7,341,253 B2 | 3/2008 | Lingenfelser | |
| 7,390,255 B2 * | 6/2008 | Walker | A63F 13/12 463/9 |

(Continued)

Primary Examiner — William H Mcculloch, Jr.

(57) ABSTRACT

A word forming game assembly for entertainment includes a panel, which comprises an array of elements. Each element can selectively present a first view, a second view, and a third view to a player. An integer generating device randomly generates an integer and presents the integer to the player. The player is permitted to select a set of the elements from the array of elements, based on the integer, for presentation of the second view. The second view of each element comprises a subset of letters of an alphabet. The player can select one of the letters from the subset of letters for presentation in the third view. The selected ones of the letters from the sets of the letters are required to comprise a word.

16 Claims, 6 Drawing Sheets

(56) References Cited

U.S. PATENT DOCUMENTS

| | | | |
|---|---|---|---|
| 7,404,764 B2 * | 7/2008 | Bozeman | G07F 17/32 273/269 |
| 7,427,235 B2 * | 9/2008 | Anderson | G07F 17/32 463/16 |
| 7,601,059 B2 * | 10/2009 | Bozeman | G07F 17/329 463/17 |
| 7,771,265 B2 * | 8/2010 | Perrie | A63F 3/00075 463/18 |
| 8,235,800 B2 * | 8/2012 | Gingher | G07F 17/3232 463/22 |
| 8,556,705 B2 * | 10/2013 | Gingher | G07F 17/32 463/22 |
| 8,672,328 B2 | 3/2014 | Bazarko | |
| 9,061,211 B1 * | 6/2015 | Lohstroh | H04L 67/28 |
| 9,373,125 B2 * | 6/2016 | Chow | G06Q 30/0251 |
| 9,373,126 B2 * | 6/2016 | Chow | G06Q 30/0251 |
| 9,373,127 B2 * | 6/2016 | Chow | H04L 67/38 |
| 10,576,365 B1 * | 3/2020 | Crammond | A63F 9/0098 |
| 2003/0027616 A1 * | 2/2003 | Vancura | G07F 17/32 463/16 |
| 2005/0192087 A1 * | 9/2005 | Friedman | G07F 17/32 463/25 |
| 2009/0280883 A1 * | 11/2009 | Haveson | G07F 17/32 463/9 |
| 2010/0279759 A1 * | 11/2010 | Perrie | A63F 3/0645 463/18 |
| 2012/0252557 A1 * | 10/2012 | Chow | H04L 67/38 463/25 |
| 2012/0252559 A1 * | 10/2012 | Chow | G06Q 30/0251 463/25 |
| 2012/0252573 A1 * | 10/2012 | Chow | G06Q 30/0251 463/30 |
| 2012/0252574 A1 * | 10/2012 | Chow | H04L 67/38 463/31 |
| 2014/0131945 A1 * | 5/2014 | McClung, III | A63F 13/335 273/272 |
| 2015/0283464 A1 * | 10/2015 | Lohstroh | H04W 4/12 463/29 |
| 2015/0290552 A1 * | 10/2015 | Owoc | A63J 1/00 472/75 |
| 2016/0307405 A1 * | 10/2016 | Koll | G07F 17/3244 |
| 2016/0332068 A1 * | 11/2016 | Ettridge | A63F 3/0421 |
| 2017/0197140 A1 | 7/2017 | Greenawalt | |
| 2018/0147482 A1 | 5/2018 | Gulotty, Jr. | |

* cited by examiner

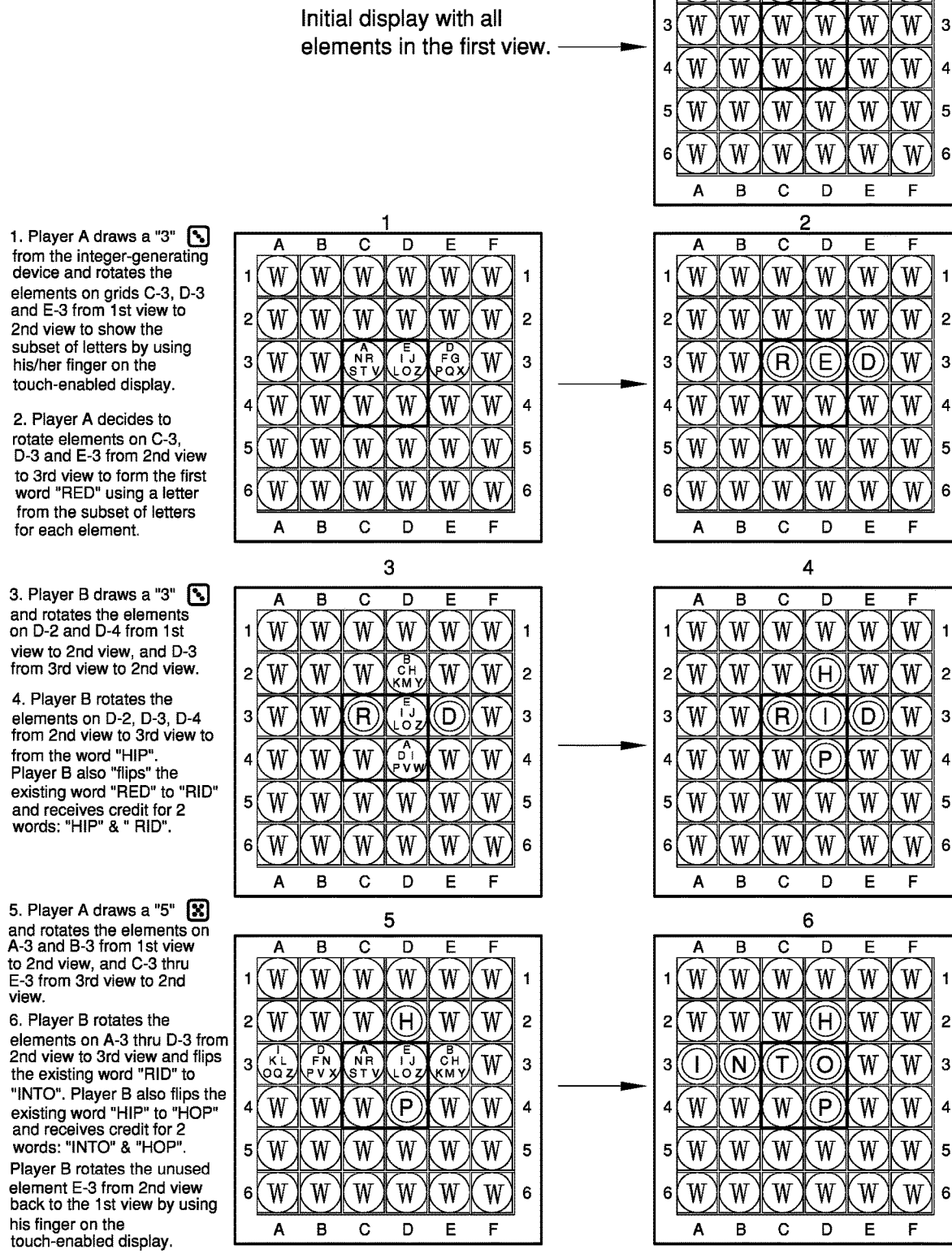

WORD FORMING GAME ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to game assemblies and more particularly pertains to a new game assembly for entertainment.

(2) Description of Related Art Including Information Disclosed Under 37 CFR 1.97 and 1.98

The prior art relates to game assemblies. Prior art word forming games may comprises a plurality of tiles and a starting gridded board.

BRIEF SUMMARY OF THE INVENTION

An embodiment of the disclosure meets the needs presented above by generally comprising a panel, which comprises an array of elements. Each element is configured for selective presentation of a first view, a second view, and a third view to a player. An integer generating device is configured to randomly generate an integer and to present the integer to the player. The player is permitted to select a set of the elements from the array of elements, based on the integer, for presentation of the second view. The second view of each element comprises a subset of letters of an alphabet. The player can select one of the letters from the subset of letters for presentation in the third view. The selected ones of the letters from the sets of the letters are required to comprise a word.

In one embodiment, the panel comprises a board, which has a plurality of indentations positioned in an upper face thereof, and each element comprises a ball. The indentations are semi-spherically shaped. The ball is selectively positionable in a respective indentation. The integer generating device may comprise a die.

In another embodiment, the panel and the integer generating device may comprise an electronic device, which may be dedicated, or which may comprise a multipurpose device, such as a smart phone, tablet computer, laptop computer, and the like. Programming code positioned on a microprocessor enables the microprocessor to command a primary display to present the array of elements to the player in the first view, and also enables the player to utilize the primary display to selectively manipulate the elements to the second view and the third view.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

Figure 1:
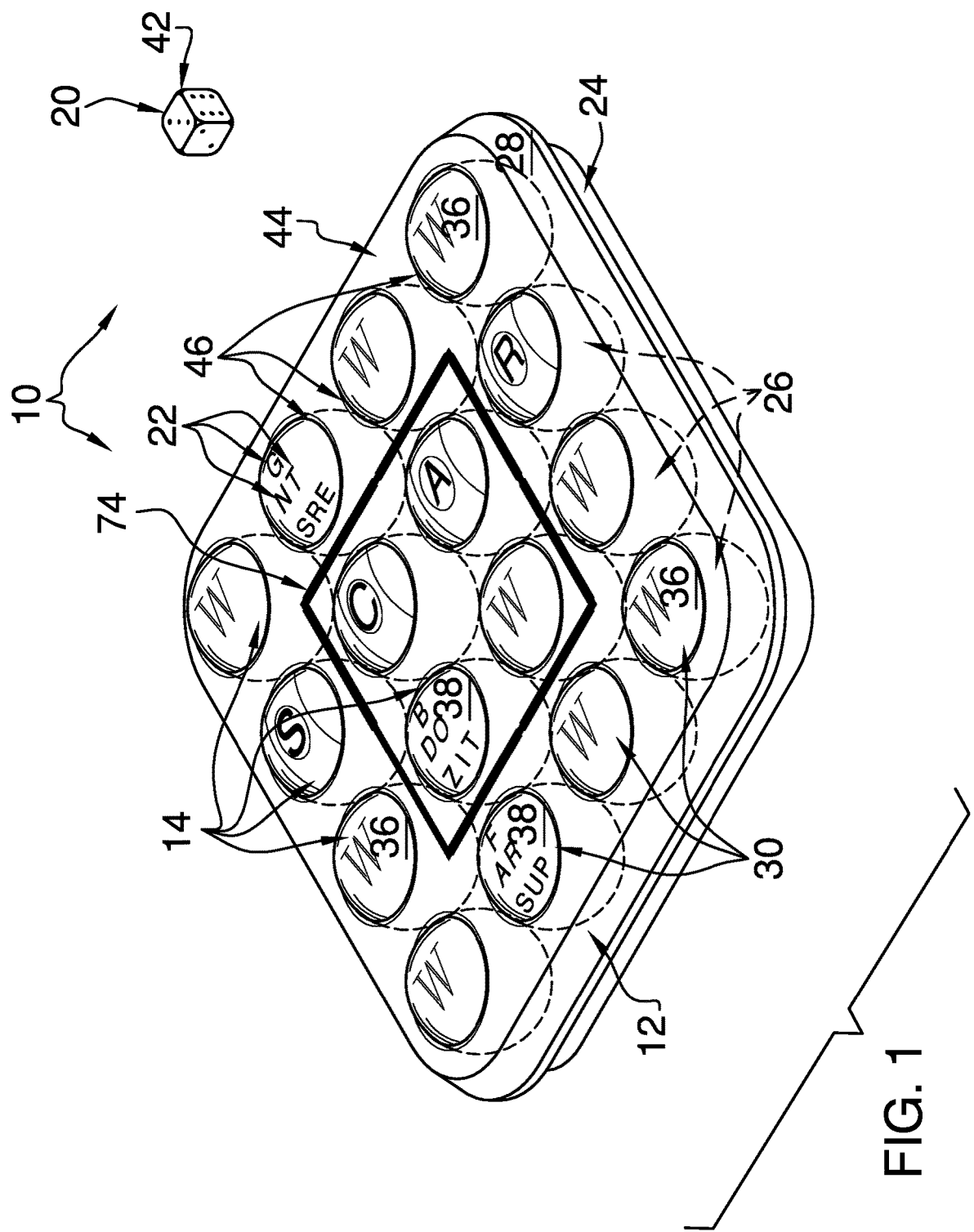
FIG. 1 is an isometric perspective view of a word forming game assembly according to an embodiment of the disclosure.

FIG. 7 presents a potential sequence of events from a respective word forming game.

DETAILED DESCRIPTION OF THE INVENTION

With reference now to the drawings, and in particular to FIGS. 1 through 7 thereof, a new game assembly embodying the principles and concepts of an embodiment of the disclosure and generally designated by the reference numeral 10 will be described.

As best illustrated in FIGS. 1 through 7, the word forming game assembly 10 generally comprises a panel 12, which comprises an array of elements 14. Each element 14 is configured to selectively present of a first view, a second view, and a third view to a player. The array of elements 14 is positioned in a plurality of rows 16 and a plurality of columns 18. The plurality of rows 16 may be numerically equivalent to the plurality of columns 18, so that each row 16 and each column 18 comprise an equivalent quantity of elements 14. The present invention also anticipates the plurality of rows 16 and the plurality of columns 18 being nonequivalent so that the array of elements 14 is nonrectangularly shaped.

The assembly 10 also comprises an integer generating device 20, which is configured to randomly generate an integer and to present the integer to the player. The player is permitted to select a set of the elements 14 from the array of elements 14, which is based on the integer, for presentation of the second view. The second view of each element 14 comprises a subset of letters 22 of an alphabet. The player can select one of the letters 22 from the subset of letters 22 for presentation in the third view. The selected ones of the letters 22 from the sets of the letters 22 are required to comprise a word.

Figure 2:
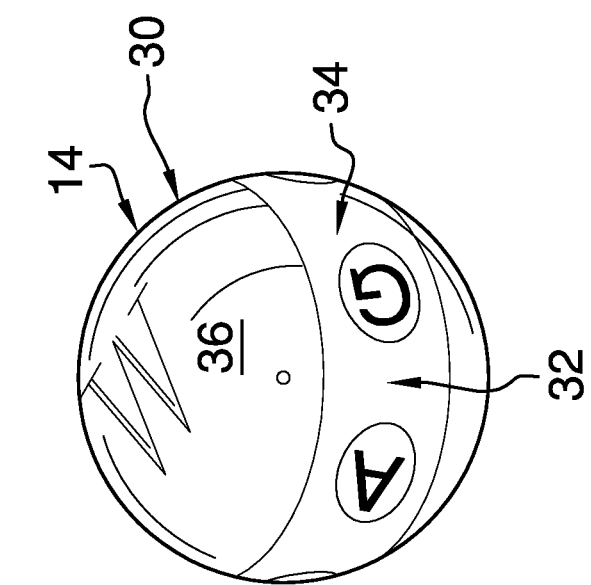
FIG. 2 is a detail view of an embodiment of the disclosure.
Figure 3:
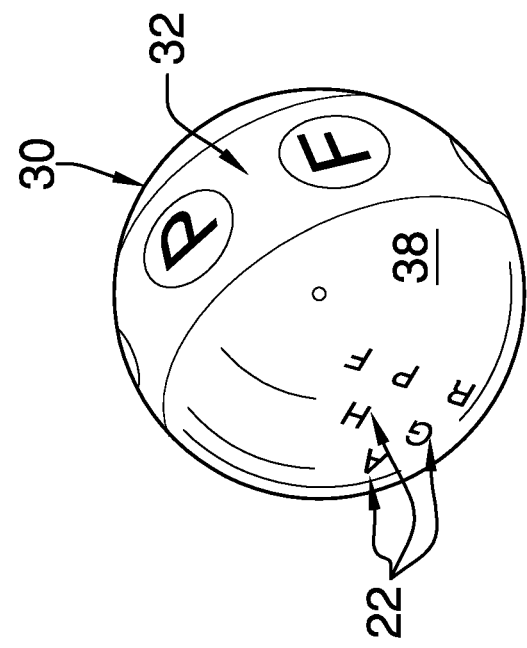
FIG. 3 is a detail view of an embodiment of the disclosure.

In one embodiment, as shown in FIGS. 1-3, the panel 12 comprises a board 24, which has a plurality of indentations 26 positioned in an upper face 28 thereof. The indentations 26 are semi-spherically shaped. In this embodiment, each element 14 comprises a ball 30. The ball 30 is selectively positionable in a respective indentation 26.

The ball 30 has a band 32 engaged thereto and extending around a circumference 34 thereof to define a first surface 36 and a second surface 38 of the ball 30. The first surface 36, the second surface 38, and the band 32 corresponding to the first view, the second view, and the third view, respectively. The letters 22 of the third view are dimensionally larger than the letters 22 of the second view.

The subset of letters 22 comprises between two and ten letters 22. The subset of letters 22 may comprise between four and eight letters 22. The subset of letters 22 may comprise six letters 22, as shown in FIG. 3. The plurality of balls 30 may be numerically equivalent to the plurality of indentations 26. The present invention also anticipates the plurality of balls 30 being numerically superior to the plurality of indentations 26.

The assembly 10 of this embodiment also comprises an instruction 40. The instruction 40 comprises a set of rules for playing a word forming game, which utilizes the board 24 and the plurality of balls 30. The set of rules may entail a player first utilizing the integer generating device 20 to generate the integer. The player then rotates a set of balls 30, which is based on the integer, from the first view to the second view. The player is positioned to form a word that comprises one letter 22 selected from each of the subsets of letters 22 on the second surfaces 38 of the set of balls 30. The player displays the formed word by rotating the balls 30 of the set of balls 30 so that the bands 32 of the balls 30 of the set of balls 30 are perpendicular to the panel 12 and the selected letters 22 are topmost.

The integer generating device 20 may comprise a die 42, or other integer generating means known to those skilled in the art of integer generation. The die 42 may be six-sided, as shown in FIG. 1, or may be of another type, such as 4-sided, 8-sided, 10-sided, and the like.

The assembly 10 of this embodiment also comprises a lid 44, which is shaped complementarily to the board 24 and which is configured to reversibly engage the board 24 to cover the upper face 28 with the balls 30 positioned in the indentations 26. The lid 44 has a plurality of holes 46 positioned therein. Each hole 46 is aligned with a respective indentation 26 so that the balls 30 are positioned to be selectively rotated within the indentations 26.

Figure 4:
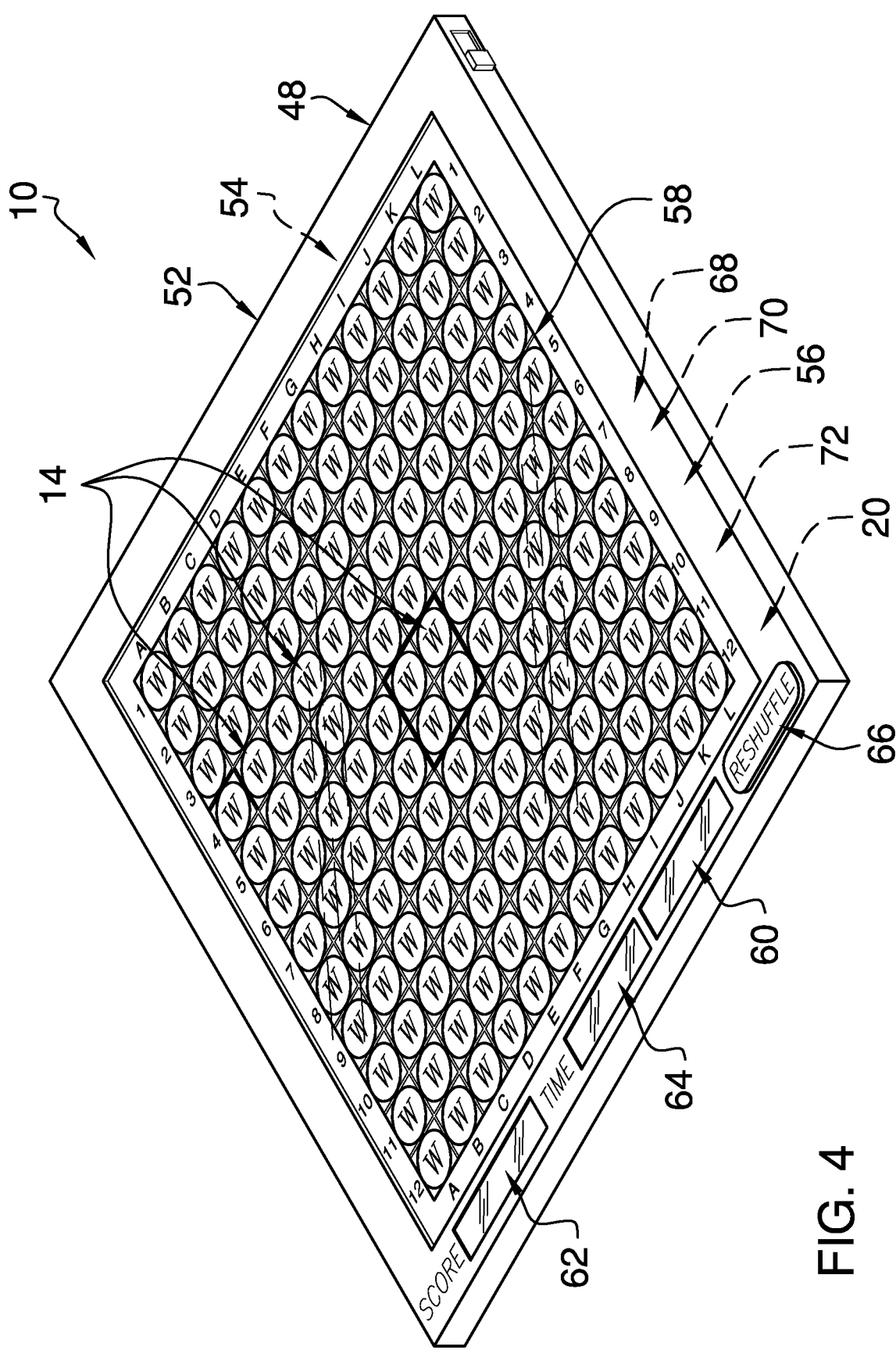
FIG. 4 is an isometric perspective view of an embodiment of the disclosure.
Figure 5:
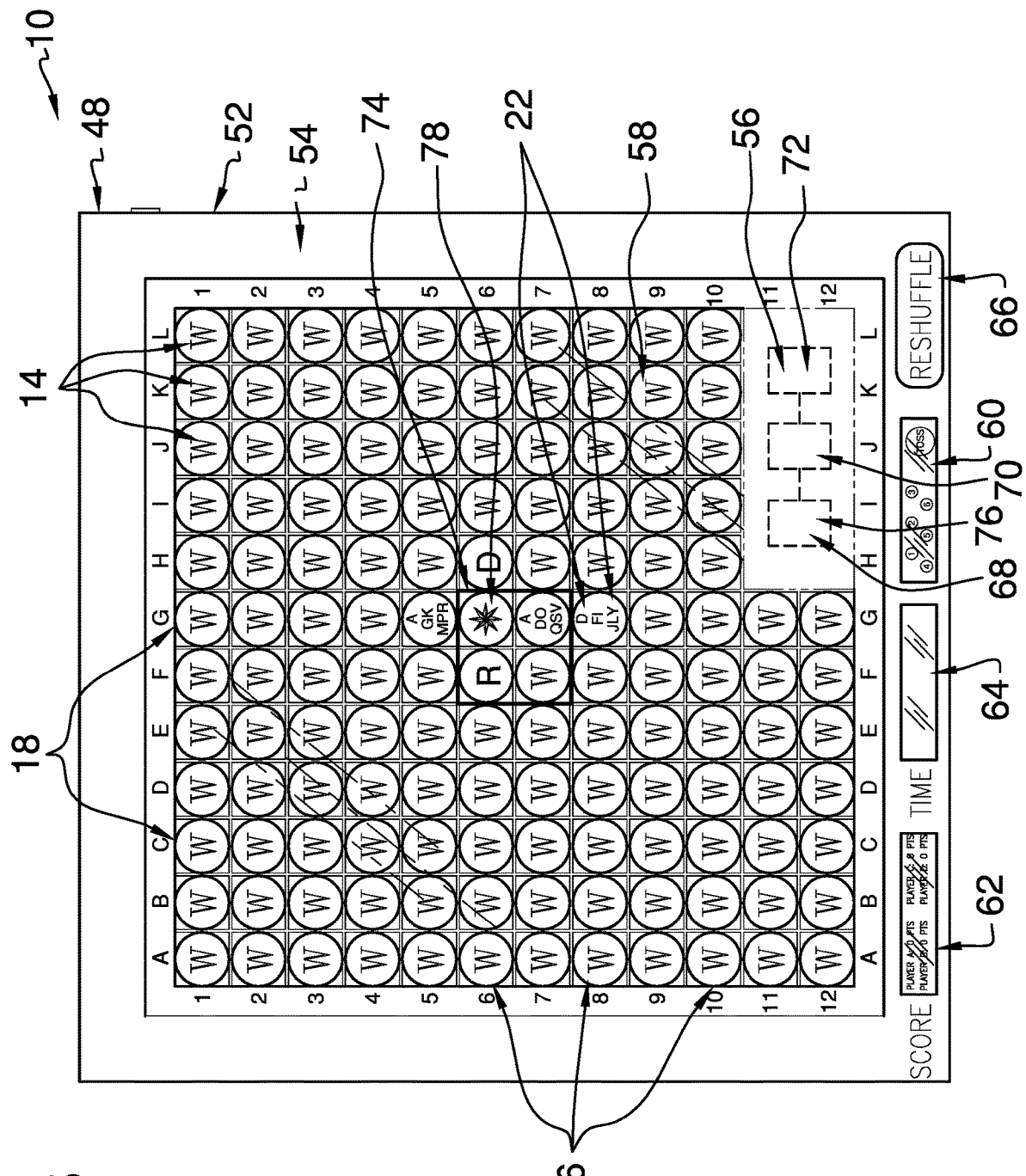
FIG. 5 is a top view of an embodiment of the disclosure.
Figure 6:
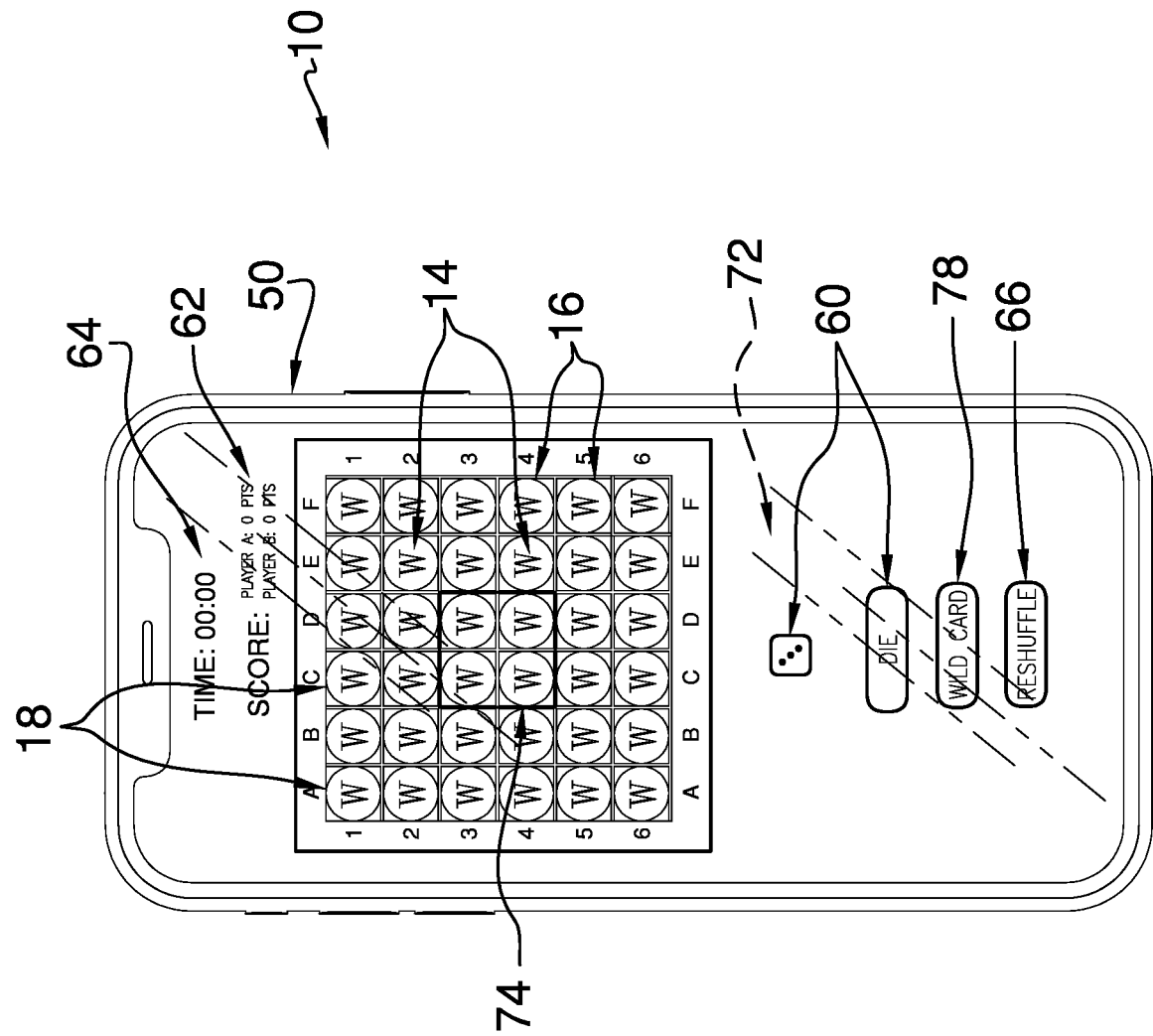
FIG. 6 is a top view of an embodiment of the disclosure.

In another embodiment, the panel 12 and the integer generating device 20 may comprise an electronic device 48, as shown in FIGS. 4-6. The electronic device 48 may be dedicated, as shown in FIGS. 4 and 5, or may comprise a multipurpose device, such as a smart phone 50, as shown in FIG. 6, tablet computer, laptop computer, and the like.

The electronic device 48 comprises a housing 52 that defines an interior space 54. A microprocessor 56 is coupled to the housing 52 and is positioned in the interior space 54. The microprocessor 56 is configured to randomly generate an integer.

A primary display 58, a number display 60, a score display 62, a time display 64, and a button 66 are coupled to the housing 52 and are operationally coupled to the microprocessor 56. The primary display 58 and the number display 60 are touch-enabled. The number display 60 is configured to be touched by the player to signal the microprocessor 56 to randomly generate an integer and to command the number display 60 to present the integer to the player. The present invention also anticipates the primary display 58 being configured to emulate the number display 60, the score display 62, the time display 64, and the button 66.

A data storage module 68 and a timer 70 are coupled to the housing 52 and are positioned in the interior space 54. The data storage module 68 and the timer 70 are operationally coupled to the microprocessor 56.

Programming code 72 is positioned on the microprocessor 56, which enables the microprocessor 56 to command the primary display 58 to present the array of elements 14 to the player in the first view.

The programming code 72 also enables the microprocessor 56 to generate an integer, which then corresponds to the quantity of elements 14 that the player is allowed to change from the first view to the second view. The programming code 72 also enables the microprocessor 56 to command the primary display 58 to convert the set of elements 14, upon touching thereof in sequence by a finger of the player, from the first view to the second view.

The programming code 72 also enables the microprocessor 56 to command the primary display 58 to convert an element 14 of the set of elements 14 from the second view to the third view upon touching by the finger of the player. This positions the player to select one letter 22 from each subset of letters 22 to create a word.

The programming code 72 also enables the microprocessor 56 to initiate the timer 70, upon presentation of the integer to the player, and to command the time display 64 to display a countdown time. The countdown time may correspond to a time allotted to a player for an entire game or for a single turn.

The programming code 72 also enables the microprocessor 56 to define a starting grid 74 within the array of elements 14. A first set of elements 14 in a game must comprise at least one of the elements 14 that is positioned within the starting grid 74.

The programming code 72 also enables the microprocessor 56 to check the word created by the player against a dictionary 76 that is positioned on the data storage module 68, to assign a point value to the word, and to command the score display 62 to present at least one of the point value and a total score for the player.

The programming code 72 also enables the microprocessor 56 to shuffle the elements 14 in the second view, upon the button 66 being actuated, so that the letters 22 that comprise the subsets of letters 22 are altered. Shuffling of the elements 14 effectively presents new subsets of letters 22 in the second view and can be performed to, for example, prevent a game in progress from stalling. The present invention anticipates the programming code 72 enabling play of a plurality of games, with each game having an associated set of rules.

By way of an example of use, a word game may be played using the board 24, the plurality of balls 30, and the die 42 according to the following sample instruction 40. At the start of the game, the balls 30 are randomly positioned in the indentations 26, with each ball 30 positioned in the first view. A first player initiates a turn of play by tossing the die 42 and then may rotate one to six of the balls 30, depending on the toss, from the first view to the second view to generate a set of elements 14 with subsets of letters 22 revealed.

The first player then will select one letter 22 from each of the subsets of letters 22 and to form a word by selectively rotating the balls 30 from the second view to the third view. Words are formed in a crossword fashion, thus reading horizontally from left to right in rows 16 or downwardly in columns 18. Succeeding players will form new words by using at least one letter 22 of any word formed previously.

Words can be "flipped" after they are played to form a new word using the same balls 30. While flipping a word, the player also may add to the beginning or end of the word to form a longer word. In a typical game, the words present at the end of the game will be different from the words that are formed at the beginning of the game. An existing word can be flipped an unlimited number of times, but a word can be used only once. It should be noted that, once a ball 30 is rotated, it remains at play for the entire game.

The balls 30 that are positioned in the second view can also be reshuffled if a "bad" combination of letters 22 is revealed and the player has difficulty in forming a word. This feature would prevent the game from ending prematurely if no words can be formed, especially in the early part of the game. Reshuffling would also maximize the number of balls 30 that can be played in a game. A player can reshuffle by repositioning all but "at play" balls 30 that are being used to form words.

The present invention also anticipates an option to use a "wild ball" 78 to increase challenge and excitement of the game. As in games that use wild cards, use of a wild ball 78 would allow the player to choose any letter of the alphabet. The player who uncovers the wild ball 78 declares what letter it will stand for. The letter will stand unless it is "flipped" by another player, in which case the new letter will stand until it is flipped again by another player. If a wild ball 78 is flipped, all incidental words that are formed using the wild card must be valid and are scored for the player performing the flip.

Scoring

The player with the highest score at the end of the game wins. Each player adds their scores for each turn. The score for a turn depends on the number of letters used to form the word based on the following table.

| # of Letters | Score |
| --- | --- |
| 1 | 1 point |
| 2 | 2 points |
| 3 | 3 points |
| 4 | 5 points |
| 5 | 7 points |
| 6 | 9 points |
| 7 | 12 points |
| 8 | 15 points |
| 9 | 18 points |
| ≥10 | 25 points |

Rules on how Balls 30 are Rotated

The first player, or any of the other players, does not have to use all the uncovered balls 30 to form a word. The first word formed should have no more letters than the integer obtained from the toss of the die 42. Succeeding players can form words comprising letters from existing word(s) in addition to letters from balls 30 up to the integer obtained with the succeeding player's toss of the die 42.

Succeeding players shall follow the following rules in rotating balls 30 from the first to the second view:
1. A player can only rotate as many balls 30 as the integer obtained from the die 42 toss.
2. A player can only rotate balls 30 in one row 16 or column.
3. A ball 30 can only be rotated if it is adjacent to an at play ball 30, and adjacent balls 30 in the same row 16 or column 18 also can be rotated to the second view.
4. Any ball 30 that is already at play (third view) can be rotated again at any time to the second view. This is done for the purpose of flipping the letter/word.
5. If a player tries to rotate more balls 30 than the number allowed by the toss of the die 42, the first ball 30 rotated will revert to its previous status (third view or first view).

Allowed Words

Only words recognized by a Standard dictionary
No proper nouns (i.e., common nouns only)
No contractions, compound words, hyphenated words or possessive words requiring an apostrophe.
No foreign words unless recognized by the Standard dictionary Passing If a player cannot form a word based on the letters 22 available from the subsets of letter 22, or for any reason, a player can "pass", that is, skip a turn. Passing is entirely a choice of the player and can be for any reason or purpose. If all players pass sequentially, the first player who passed (or any player after consecutive passes of all players) may play their usual turn or may have the option to "reshuffle" the balls 30.

Player Challenge

A player may challenge another player's word. If the word is not valid, the challenge is successful. The player who played the invalid word loses their turn and will not score. If the word is valid, the player who challenged the word receives a penalty equivalent to the score of the challenged word. A challenge must occur immediately after a word is played.

How the Game Ends

The game ends when no new words can be formed. If a timer is used, the game concludes when the time expires on all players, or when no new words can be formed, whichever occurs first.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A word forming game assembly comprising:
 a panel comprising an array of elements, each element being configured for selective presentation of a first view, a second view, and a third view to a player;
 an integer generating device configured to randomly generate an integer and to present the integer to the player, whereupon the player is permitted to select a set of the elements from the array of elements, based on the integer, for presentation of the second view, the second view of each element comprising a subset of letters of an alphabet, such that the player can select one of the letters from the subset of letters for presentation in the third view, wherein the selected ones of the letters from the sets of the letters are required to comprise a word;
 the panel comprising a board having a plurality of indentations positioned in an upper face thereof, the indentations being semi-spherically shaped;
 each element comprising a ball, the ball being selectively positionable in a respective indentation, the ball having a band engaged thereto and extending around a circumference thereof defining a first surface and a second surface of the ball, the first surface, the second surface, and the band corresponding to the first view, the second view, and the third view, respectively, and;
 an instruction comprising a set of rules for playing a word forming game utilizing the board and the plurality of balls, wherein a player first utilizes the integer generating device to generate the integer, rotates a set of balls based on the integer from the first view to the second view, positioning the player for forming a word comprising one letter selected from each of the subsets of letters on the second surfaces of the set of balls, and for displaying the formed word by rotating the balls of the set of balls such that the bands of the balls of the set of balls are perpendicular to the panel and the selected letters are topmost.

2. The word forming game assembly of claim 1, wherein the array of elements is positioned in a plurality of rows and a plurality of columns.

3. The word forming game assembly of claim 2, wherein the plurality of rows is numerically equivalent to the plurality of columns, such that each row and each column comprise an equivalent quantity of elements.

4. The word forming game assembly of claim 1, wherein the panel and the integer generating device comprise an electronic device, the electronic device comprising:
 a housing defining an interior space;
 a microprocessor coupled to the housing and positioned in the interior space, the microprocessor being configured for randomly generating an integer;
 a primary display coupled to the housing and being operationally coupled to the microprocessor, the primary display being touch-enabled; and
 programming code positioned on the microprocessor enabling the microprocessor for:
  commanding the primary display to present the array of elements to the player in the first view,
  generating an integer corresponding to the quantity of elements the player is allowed to change from the first view to the second view,
  commanding the primary display for converting the set of elements, upon touching thereof in sequence by a finger of the player, from the first view to the second view, and
  commanding the primary display for converting an element of the set of elements from the second view to the third view upon touching by the finger of the player, positioning the player for selecting one letter from each subset of letters for creating a word.

5. The word forming game assembly of claim 4, further including a number display coupled to the housing and being operationally coupled to the microprocessor, the number display being touch enabled, wherein the number display is configured for being touched by the player for signaling the microprocessor for randomly generating an integer and for commanding the number display for presenting the integer to the player.

6. The word forming game assembly of claim 4, further including:
 a timer coupled to the housing and positioned in the interior space, the timer being operationally coupled to the microprocessor;
 a time display coupled to the housing and being operationally coupled to the microprocessor; and
 the programming code enabling the microprocessor for initiating the timer upon presentation of the integer to the player and commanding the time display for displaying a countdown time.

7. The word forming game assembly of claim 4, further including the programming code enabling the microprocessor for defining a starting grid within the array of elements such that a first set of elements in a game must comprise at least one of the elements positioned within the starting grid.

8. The word forming game assembly of claim 4, further including:
 a score display coupled to the housing and being operationally coupled to the microprocessor;
 a data storage module coupled to the housing and positioned in the interior space, the data storage module being operationally coupled to the microprocessor; and
 the programming code enabling the microprocessor for checking the word created by the player against a dictionary positioned on the data storage module, assigning a point value to the word, and commanding the score display to present at least one of the point value and a total score for the player.

9. The word forming game assembly of claim 4, further including:
 a button coupled to the housing and being operationally coupled to the microprocessor; and
 the programming code enabling the microprocessor for shuffling the elements in the second view, upon the button being actuated, such that the letters comprising the subsets of letters are altered.

10. The word forming game assembly of claim 1, wherein:
 the letters of the third view are dimensionally larger than the letters of the second view; and
 the subset of letters comprising between two and ten letters.

11. The word forming game assembly of claim 10, wherein the subset of letters comprises six letters.

12. The word forming game assembly of claim 1, wherein the plurality of balls is numerically equivalent to the plurality of indentations.

13. The word forming game assembly of claim 1, wherein the integer generating device comprises a die.

14. The word forming game assembly of claim 13, wherein the die is six-sided.

15. The word forming game assembly of claim 1, further including a lid shaped complementarily to the board and being configured for reversibly engaging the board for covering the upper face with the balls positioned in the indentations, the lid having a plurality of holes positioned therein, each hole being aligned with a respective indentation, such that the balls are positioned for being selectively rotated within the indentations.

16. A word forming game assembly comprising:
- a panel comprising an array of elements, each element being configured for selective presentation of a first view, a second view, and a third view to a player, the array of elements being positioned in a plurality of rows and a plurality of columns, the plurality of rows being numerically equivalent to the plurality of columns, such that each row and each column comprise an equivalent quantity of elements;
- an integer generating device configured to randomly generate an integer and to present the integer to the player, whereupon the player is permitted to select a set of the elements from the array of elements, based on the integer, for presentation of the second view, the second view of each element comprising a subset of letters of an alphabet, such that the player can select one of the letters from the subset of letters for presentation in the third view, wherein the selected ones of the letters from the sets of the letters are required to comprise a word;
- the panel comprising a board having a plurality of indentations positioned in an upper face thereof, the indentations being semi-spherically shaped;
- each element comprising a ball, the ball being selectively positionable in a respective indentation, the ball having a band engaged thereto and extending around a circumference thereof defining a first surface and a second surface of the ball, the first surface, the second surface, and the band corresponding to the first view, the second view, and the third view, respectively, the letters of the third view being dimensionally larger than the letters of the second view, the subset of letters comprising between two and ten letters, the subset of letters comprising between four and eight letters, the subset of letters comprising six letters, the plurality of balls being numerically equivalent to the plurality of indentations;
- an instruction comprising a set of rules for playing a word forming game utilizing the board and the plurality of balls, wherein a player first utilizes the integer generating device to generate the integer, rotates a set of balls based on the integer from the first view to the second view, positioning the player for forming a word comprising one letter selected from each of the subsets of letters on the second surfaces of the set of balls, and for displaying the formed word by rotating the balls of the set of balls such that the bands of the balls of the set of balls are perpendicular to the panel and the selected letters are topmost;
- the integer generating device comprising a die, the die being six-sided; and
- a lid shaped complementarily to the board and being configured for reversibly engaging the board for covering the upper face with the balls positioned in the indentations, the lid having a plurality of holes positioned therein, each hole being aligned with a respective indentation, such that the balls are positioned for being selectively rotated within the indentations.

* * * * *